United States Patent
Chatterjee et al.

(10) Patent No.: US 10,148,608 B2
(45) Date of Patent: Dec. 4, 2018

(54) CHARACTERIZING AND MANAGING SOCIAL NETWORK INTERACTIONS

(71) Applicant: LinkedIn Corporation, Mountain View, CA (US)

(72) Inventors: Shaunak Chatterjee, Sunnyvale, CA (US); Yu Shi, Urbana, IL (US); Myunghwan Kim, San Jose, CA (US); Mitul Tiwari, Mountain View, CA (US); Souvik Ghosh, San Jose, CA (US); Romer E. Rosales-Delmoral, Burlingame, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 15/063,807

(22) Filed: Mar. 8, 2016

(65) Prior Publication Data
US 2017/0264584 A1    Sep. 14, 2017

(51) Int. Cl.
*H04L 12/58* (2006.01)
*H04L 29/08* (2006.01)
*G06F 11/34* (2006.01)

(52) U.S. Cl.
CPC .......... *H04L 51/32* (2013.01); *G06F 11/3438* (2013.01); *H04L 67/10* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 8,468,110 B1* | 6/2013 | Podgorny | ........... | G06F 11/3438 706/45 |
| 8,965,967 B2* | 2/2015 | Gilbert | ................. | G06Q 10/00 709/204 |
| 9,015,247 B2* | 4/2015 | Whitney | ............ | G06Q 30/0201 709/204 |
| 9,703,837 B1* | 7/2017 | Teng | .................... | G06F 17/3053 |
| 2012/0041907 A1* | 2/2012 | Wang | .................... | G06Q 30/02 706/12 |
| 2012/0166532 A1* | 6/2012 | Juan | ................... | G06Q 30/0224 709/204 |

(Continued)

OTHER PUBLICATIONS

A. Ansari et al: "Modeling multiple relationships in social networks" Journal of Marketing Research. 48(4):713-728, 2011. Downloaded from journals.ama.org on Nov. 11, 2016. journals.ama.org/doi/abs/10.1509/jmkr.48.4.713.

(Continued)

*Primary Examiner* — Thomas J Dailey
(74) *Attorney, Agent, or Firm* — Park, Vaughan, Fleming & Dowler LLP; Chia-Hsin Suen

(57) ABSTRACT

The disclosed embodiments provide a system for facilitating interaction within a social network. During operation, the system obtains a set of attributes of a social network of a first member and a set of historic interactions in the social network. Next, the system analyzes the attributes and the historic interactions to predict an effect of a potential interaction between the first member and a second member of the social network on subsequent interactions in the social network. The system then uses the predicted effect to generate output for modulating the subsequent interactions in the social network.

20 Claims, 6 Drawing Sheets

(56) References Cited

U.S. PATENT DOCUMENTS

| | | | | |
|---|---|---|---|---|
| 2012/0278262 A1* | 11/2012 | Morgenstern | .......... | G06Q 10/10 |
| | | | | 706/12 |
| 2013/0103758 A1* | 4/2013 | Alison | .................. | G06Q 30/02 |
| | | | | 709/204 |
| 2013/0212173 A1* | 8/2013 | Carthcart | .............. | G06Q 50/01 |
| | | | | 709/204 |
| 2016/0042279 A1* | 2/2016 | Wong | ................... | H04L 67/306 |
| | | | | 706/46 |

OTHER PUBLICATIONS

D. Greene et al: "Producing a unified graph representation from multiple social network views" In Proceeding of the 5th Annual ACM Web Science Conference, pp. 118-121. ACM, 2013. Downloaded from dl.acm.org on Nov. 11, 2016. dl.acm.org/citation.cfm?id=2464471.

* cited by examiner

CHARACTERIZING AND MANAGING SOCIAL NETWORK INTERACTIONS

BACKGROUND

Field

The disclosed embodiments relate to social networks. More specifically, the disclosed embodiments relate to techniques for characterizing and managing social network interactions.

Related Art

Social networks may include nodes representing individuals and/or organizations, along with links between pairs of nodes that represent different types and/or levels of social familiarity between the nodes. For example, two nodes in a social network may be connected as friends, acquaintances, family members, classmates, and/or professional contacts. Social networks may further be tracked and/or maintained on web-based social networking services, such as online professional networks that allow the individuals and/or organizations to establish and maintain professional connections, list work and community experience, endorse and/or recommend one another, run advertising and marketing campaigns, promote products and/or services, and/or search and apply for jobs.

In turn, social networks and/or online professional networks may facilitate business activities such as sales, marketing, and/or recruiting by the individuals and/or organizations. For example, sales professionals may use an online professional network to locate prospects, maintain a professional image, establish and maintain relationships, and/or engage with other individuals and organizations. Similarly, recruiters may use the online professional network to search for candidates for job opportunities and/or open positions.

Moreover, the dynamics of social networks may shift as connections among users evolve. For example, a user may add connections within a social network over time. Each new connection may increase the user's interaction with certain parts of the social network and/or decrease the user's interaction with other parts of the social network. Consequently, use of social networks may be improved by mechanisms for characterizing and/or modulating the dynamics among users in the social networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
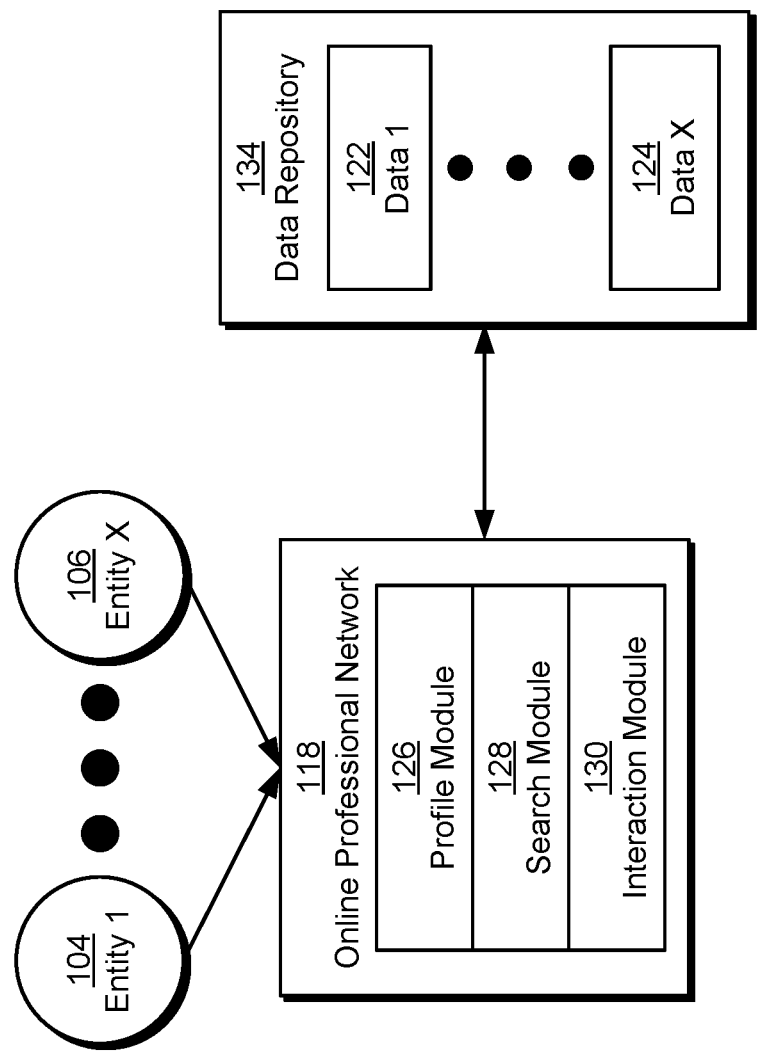
FIG. 1 shows a schematic of a system in accordance with the disclosed embodiments.

The disclosed embodiments provide a method, apparatus, and system for facilitating interaction within a social network. As shown in FIG. 1, the social network may include an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. Profile module 126 may also allow the entities to view the profiles of other entities in online professional network 118.

The entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature on online professional network 118 to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, interaction module 130 may allow an entity to add other entities as connections, follow other entities, send and receive messages with other entities, join groups, and/or interact with (e.g., create, share, re-share, like, and/or comment on) posts from other entities.

Those skilled in the art will appreciate that online professional network 118 may include other components and/or modules. For example, online professional network 118 may include a homepage, landing page, and/or content feed that provides the latest postings, articles, and/or updates from the entities' connections and/or groups to the entities. Similarly, online professional network 118 may include features or mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in online professional network 118 may be tracked and stored in a database, data warehouse, cloud storage, and/or other data-storage mechanism providing data repository 134.

Figure 2:
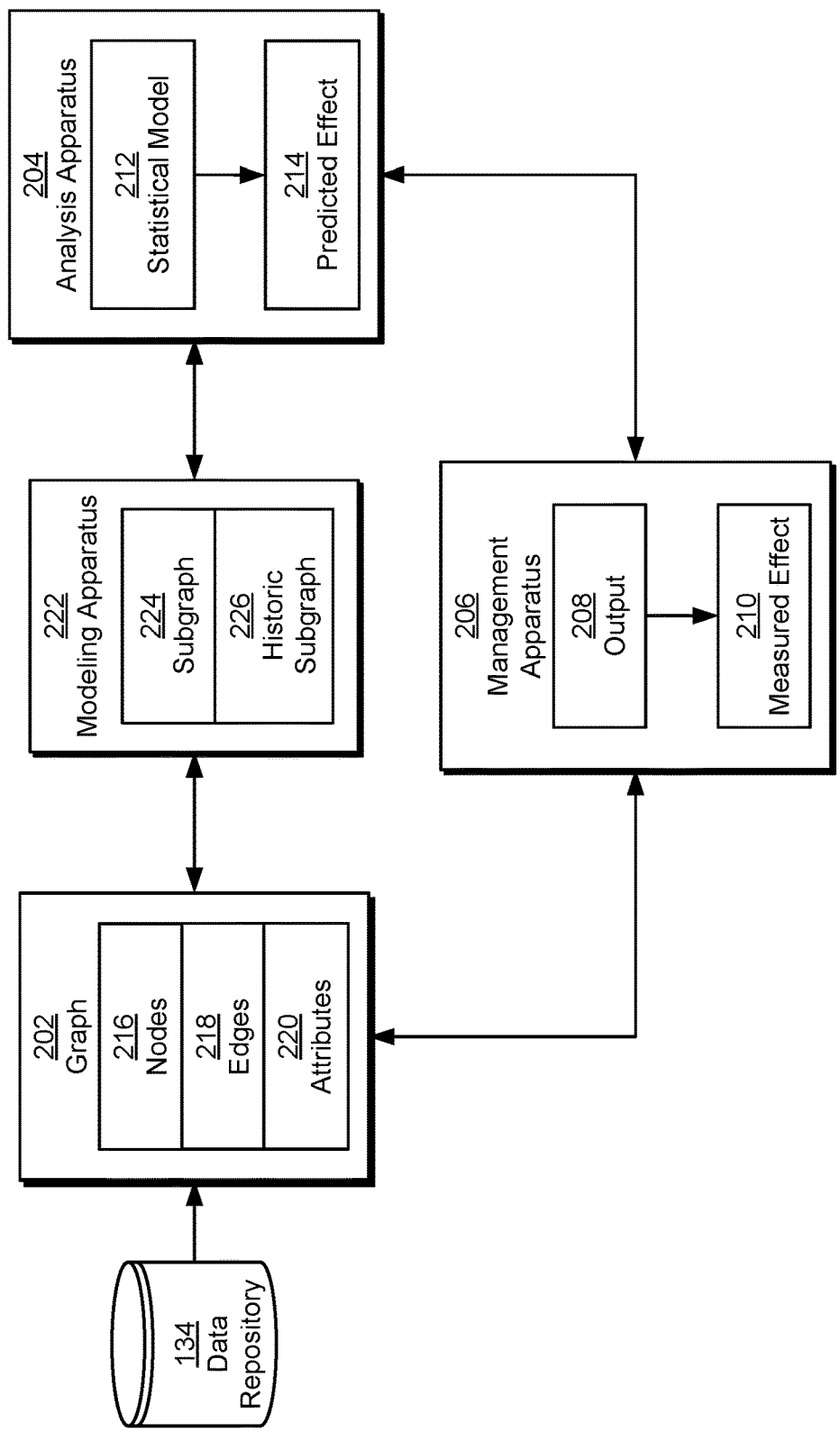
FIG. 2 shows a system for facilitating interaction within a social network in accordance with the disclosed embodiments.

As shown in FIG. 2, data in data repository 134 may be used to form a graph 202 representing the entities, the entities' relationships, and/or the entities' activities in a social network such as online professional network 118 of FIG. 1. Graph 202 may include a set of nodes 216, a set of edges 218, and a set of attributes 220.

Nodes 216 in graph 202 may represent entities in the online professional network. For example, the entities represented by nodes 216 may include individual members (e.g., users) of the social network, groups joined by the members, and/or organizations such as schools and companies. Nodes 216 may also, or instead, represent other objects and/or data in the social network, such as industries, locations, posts, articles, multimedia, job listings, ads, and/or messages.

Edges 218 may represent relationships and/or interaction between pairs of nodes 216 in graph 202. For example, edges 218 may be directed and/or undirected edges that specify connections between pairs of members, education of members at schools, employment of members at companies, following of a member or company by another member, business relationships and/or partnerships between organizations, and/or residence of members at locations. Edges 218 may also indicate interactions between the members, such as creating, viewing, liking, commenting on, or sharing articles or posts; sending messages; viewing profiles; and/or endorsing one another.

Nodes 216 and/or edges 218 may also contain attributes 220 that describe the corresponding entities, interactions, and/or relationships in the social network. For example, a node representing a member may include attributes 220 such as name, username, industry, title, seniority, job function, password, and/or email address. Attributes of the member may also be matched to a number of member segments, with each member segment containing a group of members that share one or more common attributes. An edge representing a connection between the member and another member may have attributes 220 such as a time at which the connection was made, the type of connection (e.g., friend, relative, colleague, classmate, employee, following, etc.), and/or the strength of the connection (e.g., how well the members know one another). An edge representing an interaction between the two members may have attributes 220 such as a time or period in which the interaction occurred, the type of interaction (e.g., profile view, message, interaction with a post, endorsement, etc.), and/or the strength of the interaction (e.g., length of message, number of messages sent over a period of time, sentiment of interaction, etc.).

As a result, graph 202 may be used to generate a number of "views" of the social network. The views may include a relationship view that includes a subset of edges 218 representing relationships (e.g., friendships, professional relationships, family relationships, etc.) within the social network. The views may also include one or more interaction views that include subsets of edges 218 representing specific types of interactions in the social network, such as profile viewings, messages, news feed interactions (e.g., consumption or interaction with posts or updates), and/or endorsements. The views may further be isolated to certain member segments, clusters, and/or other groupings of the members.

In turn, the relationships and interactions modeled by graph 202 may be used to characterize and manage the relationships and interactions among members of the social network. In particular, a modeling apparatus 222 may obtain a subgraph 224 of graph 202 that includes the most recent or current set of relationships and/or interactions associated with a given member, as well as a historic subgraph 226 of graph 202 that includes a set of historic relationships and/or interactions associated with the member. For example, subgraph 224 may model the member's connections and interactions in the social network within a given month (e.g., the most recent month), and historic subgraph 226 may model the member's connections and interactions in the social network within the preceding month. Consequently, subgraph 224 and historic subgraph 226 may reflect changes in the member's relationships and/or interactions within the social network over time.

Subgraph 224 and/or historic subgraph 226 may also be extended to other portions of graph 202. For example, subgraph 224 and historic subgraph 226 may include both first-degree and second-degree connections of the member, as well as interactions among the first- and second-degree connections within the corresponding time periods. In another example, subgraph 224 and historic subgraph 226 may include all members of the social network that share a common attribute or member segment (e.g., employer, industry, school, location, seniority, etc.), independently of whether the member includes the attribute or is in the member segment.

Next, an analysis apparatus 204 may apply a statistical model 212 to subgraph 224 and historic subgraph 226 to produce a predicted effect 214 of an interaction between the member and another member of the social network on subsequent in the social network. For example, analysis apparatus 204 may use statistical model 212 to predict the effect of a new connection between the two members on the member's subsequent interactions with existing connections in the social network and/or the other member.

Predicted effect 214 may represent an increase or reduction in the subsequent interactions. Continuing with the previous example, predicted effect 214 may be calculated as an aggregate measure of the member's subsequent interactions with the existing connections after the new connection is made, divided by an aggregate measure of the member's current interactions with the existing connections. As a result, a value of predicted effect 214 that is less than 1 may indicate cannibalization of the member's interaction with the existing connections by the new connection. Conversely, a value of predicted effect 214 that is greater than 1 may indicate a synergistic effect, in which the new connection increases the member's interaction with existing connections.

Statistical model 212 may be trained using subgraph 224 and historic subgraph 226. For example, an estimation technique may be applied to different versions and/or views of subgraph 224 and historic subgraph 226 to identify one or more parameters of statistical model 212. After statistical model 212 is trained, it may be used to generate predicted effect 214 for different potential interactions and/or connections within the social network. For example, analysis apparatus 204 may use statistical model 212 to predict the effect of a new connection between two users on the users' interactions with other users in the social network. In another example, analysis apparatus 204 may use statistical model 212 to predict the effect of a given type of interaction between the two users on the users' other interactions, which may be of the same or different type. Using statistical models to predict the effects of interactions within social networks is described in further detail below with respect to FIG. 3.

After predicted effect 214 is produced for different relationships, member segments, and/or interactions in social network, management apparatus 206 may generate output 208 for modulating subsequent interactions in the social network. For example, management apparatus 206 may adopt a strategy that aims to increase the overall amount of interaction within the social network. As a result, management apparatus 206 may output recommendations to members of the social network to make new connections, view profiles, transmit messages, and/or otherwise participate in interactions that potentially increase the members' interaction with existing connections and/or the new connections. Management apparatus 206 may also generate non-recommendation-based output 208 for modulating the subsequent interactions, such as showing posts from a member in a news feed of another member and/or reminding the member of an ongoing message thread with the other member to encourage interaction between the two members.

Management apparatus 206 may also obtain a measured effect 210 associated with output 208 and provide measured effect 210 as feedback that is used to update statistical model 212. For example, measured effect 210 may be obtained as the observed change in the amount or frequency of a certain type of interaction and/or all interactions for a given member after the member adds a new connection and/or performs an interaction associated with an outputted recommendation, post, or reminder from management apparatus 206. Management apparatus 206 may provide the observed change to analysis apparatus 204, and analysis apparatus 204 may update the parameters of statistical model 212 to better reflect the observed change.

By characterizing the interplay among different types of interactions and users in the social network, the system of FIG. 2 may identify and predict the effects of certain interactions and types of interactions on subsequent interactions in the social network. In turn, the effects may be used to influence the subsequent interactions and improve use of the social network by the members.

Those skilled in the art will appreciate that the system of FIG. 2 may be implemented in a variety of ways. First, analysis apparatus 204, management apparatus 206, modeling apparatus 222, and/or data repository 134 may be provided by a single physical machine, multiple computer systems, one or more virtual machines, a grid, one or more databases, one or more filesystems, and/or a cloud computing system. Analysis apparatus 204, management apparatus 206, and modeling apparatus 222 may additionally be implemented together and/or separately by one or more hardware and/or software components and/or layers.

Second, a number of statistical models and/or techniques may be used to generate predicted effect 214. For example, the functionality of statistical model 212 may be provided by a regression model, artificial neural network, support vector machine, decision tree, naïve Bayes classifier, Bayesian network, clustering technique, hierarchical model, and/or ensemble model. Moreover, the same statistical model or separate statistical models may be used to generate predicted effect 214 for various members, attributes 220, connections, and/or interactions in the social network. For example, a separate instance of statistical model 212 may be used to characterize and predict changes in the interactions and/or relationships of a different member and/or member segment of the social network. In another example, multiple statistical models may be used to model and modulate different types of interactions (e.g., profile views, feed interactions, active interactions, new connections, etc.) in the social network.

Figure 3:
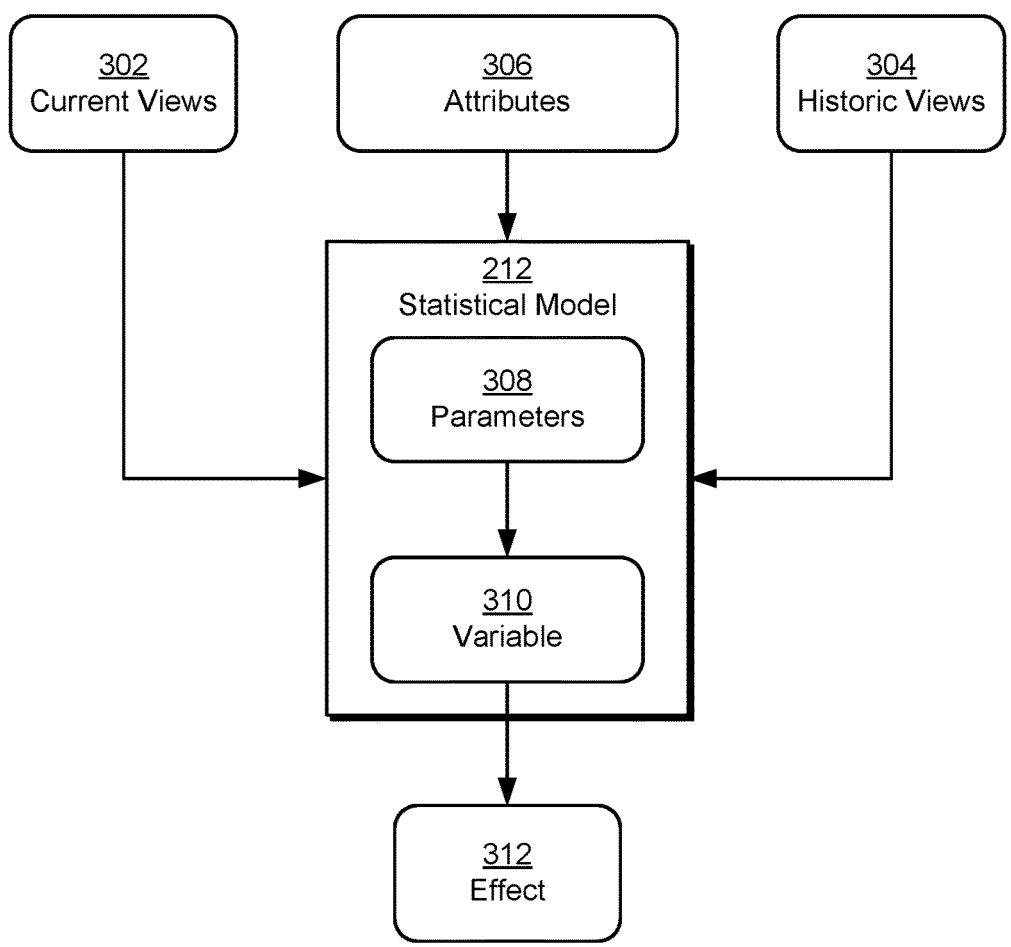
FIG. 3 shows an exemplary prediction of the effect of an interaction within a social network on subsequent interactions in the social network in accordance with the disclosed embodiments.

FIG. 3 shows an exemplary prediction of an effect 312 of an interaction within a social network on subsequent interactions in the social network in accordance with the disclosed embodiments. Effect 312 may be generated by statistical model 212 based on a set of inputs, which include a set of current views 302 of the social network, a set of historic views 304 of the social network, and a set of attributes 306 associated with the social network.

Current views 302 and historic views 304 may represent interactions in the social network within a current and previous period, respectively. For example, current views 302 may track new connections, messages, profile views, news feed interactions, endorsements, and/or other types of interactions between members of the social network in the most recent month, and historic views may track the interactions in the previous month.

Attributes 306 may include information not directly associated with views of interaction in the social network. For example, attributes 306 may identify all connections in the social network up to a given point (e.g., the end of the current or previous period). Attributes 306 may also identify member segments of members in the social network. For example, attributes 306 may include industries, companies, company types, schools, skills, decision makers, publishers, seniorities, and/or job functions of the members.

Current views 302, historic views 304, and attributes 306 may be provided as input that is used to estimate one or more parameters 308 of statistical model 212. For example, parameters 308 may be identified by regressing on a feature vector containing current views 302, historic views 304, and/or attributes 306. After parameters 308 are estimated, statistical model 212 may be used to generate a value of a variable 310 representing effect 312. For example, statistical model 212 may be used to produce a numeric value representing a change in a member's interaction with other members or member segments of the social network after the member adds a new connection with another member and/or otherwise interacts with the other member. Effect 312 may then be used to generate output for modulating subsequent interaction in the social network, as described above.

More specifically, current views 302 and historic views 304 may be modeled as a set of edges between nodes representing the members. For example, each "view" v in a set of views V of the social network may be represented as a weighted graph $(U, E^{(v)})$, where $E^{(v)}$ represents an edge (x, y) between two members x and y in a set of nodes U and a corresponding edge strength $\lambda^{(v)}(x, y)$. Each edge in the view may thus represent a type of interaction (e.g., new connection, feed interaction, profile view, active interaction, messaging, etc.) between the two members, and the edge strength may represent the amount or frequency of the interaction (e.g., number of messages) over the corresponding current or previous period.

In turn, the edge strength between two members x and y given a set of neighbors $N_x$ connected to member x in the social network may be represented by the following:

$$\lambda N_x^{(v)}(x,y) \in \mathbb{R}_{\geq 0}$$

The aggregated edge strength between x and a set of users S in view v may then be defined using the following:

$$\Lambda_{N_x}^{(v)}(x, S) := \sum_{y \in S} \lambda_{N_x}^{(v)}(x, y)$$

A change in the member's interaction with the social network after connecting to member z may be represented by a "total evolutionary rate" that is defined as the ratio of the member's aggregated edge strength with all of his/her connections after the new connection is made to the member's aggregated edge strength with all of his/her connections before the connection was made:

$$r_{N_x}^{(v)}(x; z) := \frac{\Lambda_{N_x \cup \{z\}}^{(v)}(x, N_x \cup \{z\})}{\Lambda_{N_x}^{(v)}(x, N_x)}$$

Similarly, a "restricted evolutionary rate" may be defined as the ratio of the member's aggregated edge strength with the member's existing connections after the new connection is made to the member's aggregated edge strength with the existing connections before the connection was made:

$$w_{N_x}^{(v)}(x; z) = \frac{\Lambda_{N_x \cup \{z\}}^{(v)}(x, N_x)}{\Lambda_{N_x}^{(v)}(x, N_x)}$$

Thus, the "total evolutionary rate" may represent the effect of the new connection on the member's interaction within the social network, including the new connection, and the "restricted evolutionary rate" may represent the effect of the new connection on the member's interaction with the existing connections, which exclude the new connection. If either representation is less than 1, the member's corresponding interactions may be cannibalized, or reduced, by the new connection. If either representation is greater than 1, the member's corresponding interactions may be synergized, or increased, as a result of the new connection.

The aggregated edge strength used to calculate the above representations may be measured by aggregating events related to a given network view over a period. Because multiple new connections may be made over a longer period (e.g., a month), the restricted evolutionary rate may be reformulated as an "accumulated restricted evolutionary rate" that is defined in terms of the time period T and new connections $\tilde{N}_x^T$:

$$W_{N_x}^{(v)}(x; T) := \frac{\Lambda_{N_x \cup \tilde{N}_x^T}^{(v)}(x, N_x)}{\Lambda_{N_x}^{(v)}(x, N_x)}$$

Similarly, the total evolutionary rate may be reformulated as an "accumulated total evolutionary rate" using the following:

$$R_{N_x}^{(v)}(x; T) := \frac{\Lambda_{N_x \cup \tilde{N}_x^T}^{(v)}(x, N_x \cup \tilde{N}_x^T)}{\Lambda_{N_x}^{(v)}(x, N_x)}$$

A statistical model (e.g., statistical model 212) representing the restricted evolutionary rate may be defined using the following log-normal representation:

$$w_{N_x}^{(v)}(x;z) \sim \ln \mathcal{N}(g_v(x,z), \sigma_v^2) \qquad (1)$$

In the above representation, g is a function on v, x, and z, which takes information from the ego networks of x and z in multi-view V, and $\sigma_v^2$ is the variance of the distribution for a given view v. By learning the parameters of g, the effect of a new connection on the interaction of x with the existing connections may be characterized. The model may also be simplified so that g is additive with respect to each view $\tilde{v} \in \tilde{V}$ and each covariate $\phi_{x,z}^{(\tilde{v})}$ on the view:

$$g(V; x, z) = \sum_{\tilde{v} \in \tilde{V}} g^{(\tilde{v})}(x, z) \text{ s.t. } g^{(\tilde{v})}(x, z) = \sum_{\phi^{(\tilde{v})}} g^{(\tilde{v},\phi)}(\phi_{x,z}^{(\tilde{v})}) \qquad (2)$$

Because observations of changes in interactions may be limited to the accumulated total evolutionary rate and the accumulated restricted evolutionary rate, inference using the model may be based on the observations. In particular, for $\tilde{N}_x^T = \{z_1, z_2, \ldots, z_{|\tilde{N}_x^T|}\}$, where $z_k$ is the $k^{th}$ new connection of x, $M_k := \{z_1, z_2, \ldots, z_k\}$ for k=0, 1, ..., $|\tilde{N}_x^T|$, any $|\tilde{N}_x^T| \ll |N_x|$, and any $|M_k| \ll |N_x|$:

$$\frac{\Lambda_{N_x \cup M_{k-1} \cup \{z_k\}}^{(v)}(x, N_x)}{\Lambda_{N_x \cup M_{k-1}}^{(v)}(x, N_x)} \approx \frac{\Lambda_{N_x \cup \{z_k\}}^{(v)}(x, N_x)}{\Lambda_{N_x}^{(v)}(x, N_x)}$$

The approximation above may be used to derive the following:

$$W_{N_x}^{(v)}(x; T) = \frac{\Lambda_{N_x \cup \tilde{N}_x^T}^{(v)}(x, N_x)}{\Lambda_{N_x}^{(v)}(x, N_x)} \qquad (3)$$

-continued $$= \prod_{k=1}^{|\tilde{N}_x^T|} \frac{\Lambda_{N_x \cup M_{k\ldots 1} \cup \{z_k\}}^{(v)}(x, N_x)}{\Lambda_{N_x \cup M_{k\ldots 1}}^{(v)}(x, N_x)}$$

$$\approx \prod_{k=1}^{|\tilde{N}_x^T|} \frac{\Lambda_{N_x \cup \{z_k\}}^{(v)}(x, N_x)}{\Lambda_{N_x}^{(v)}(x, N_x)}$$

$$= \prod_{k=1}^{|\tilde{N}_x^T|} w_{N_x}^{(v)}(x; z_k).$$

Assuming the independence of $\{w_{N_x}^{(v)}(x; z_k)\}_{k=1}^{|\tilde{N}_x^T|}$, Equation 1 may be substituted into Equation 3 to obtain the following:

$$w_{N_x}^{(v)}(x; T) \sim \ln \mathcal{N}\left(\sum_{k=1}^{|\tilde{N}_x^T|} g_v(x, z_k), |\tilde{N}_x^T| \cdot \sigma_v^2\right) \quad (4)$$

As the accumulated restricted evolutionary rate is observed, the likelihood of the log-normal distribution may be derived as the following:

$$\mathcal{L} = -\sum_{x \in U} \frac{\left(\log w_{N_x}^{(v)}(x; T) - \sum_{k=1}^{|\tilde{N}_x^T|} \sum_{\tilde{v} \in \mathcal{V}, \phi} g_v^{(\tilde{v}, \phi)}(\phi_{x, z_k}^{(\tilde{v})})\right)^2}{2 \cdot |\tilde{N}_x^T| \cdot \sigma_v^2} + \text{const.}$$

In the above likelihood function, each covariate $\phi_{x,z_k}^{(\tilde{v})}$ depends on x and each new connection $z_k$. Maximum likelihood estimation may then be used to infer $g_v^{(\tilde{v}, \phi)}$ by minimizing the weighted sum of squared residuals:

$$\min_{g_v^{(\tilde{v}, \phi)}} \sum_{x \in U} \frac{\left(\log w_{N_x}^{(v)}(x; T) - \sum_{k=1}^{|\tilde{N}_x^T|} \sum_{\tilde{v} \in \mathcal{V}, \phi} g_v^{(\tilde{v}, \phi)}(\phi_{x, z_k}^{(\tilde{v})})\right)^2}{|\tilde{N}_x^T|}. \quad (5)$$

Each covariate function $g_v^{(\tilde{v}, \phi)}$ may be represented as a piecewise linear function to enable scaling of the statistical inference and flexibility in defining the covariate function. For each covariate $\phi^{(\tilde{v})}$, the lower boundary of the $i^{th}$ segment may be denoted by $b_i^{(\tilde{v}, \phi)}$. In turn, the $i^{th}$ feature may be represented by the following:

$$f_i^{(\tilde{v}, \phi)}(\phi^{(\tilde{v})}) := (\phi^{(\tilde{v})} - b_i^{(\tilde{v}, \phi)}) 1_{[\phi^{(\tilde{v})} \geq b_i^{(\tilde{v}, \phi)}]} \quad (6)$$

For each covariate $\phi^{(\tilde{v})}$, combining features derived from all segments yields a feature mapping $\phi^{(\tilde{v})} \mapsto f^{(\tilde{v}, \phi)}(\phi^{(\tilde{v})})$. The mappings may further be concatenated for all covariates in all network views to obtain a feature function $(x,z) \mapsto f(x,z)$. In turn, $g_v(x,z)$ may be expressed by $c_v \cdot f(x, z)$, where c is the coefficient vector containing parameters 308 of the model. The above expression may be substituted into Equation 5 to obtain the following standard linear least squares problem with a closed-form solution:

$$\min_{c_v} \sum_{x \in U} \frac{1}{|\tilde{N}_x^T|} \left(\log W_{N_x}^{(v)}(x; T) - c_v \cdot \sum_{k=1}^{|\tilde{N}_x^T|} f(x, z_k)\right)^2 \quad (7)$$

After parameters 308 are estimated, statistical model 212 may be used to determine the aggregated edge strength of x after a new connection to z is made. Because the aggregated edge strength is correlated with the asymmetrically distributed restricted evolutionary rate, the predicted aggregated edge strength may be modeled by:

$$\hat{\Lambda}_{N_x \cup \{z\}}^{(v)}(x, N_x \cup \{z\}) = \Lambda_{N_x}^{(v)}(x, N_x) \hat{w}_{N_x}^{(v)}(x; z) + \hat{\lambda}_{N_x \cup \{z\}}^{(v)}(x, z) = \quad (8)$$

$$\Lambda_{N_x}^{(v)}(x, N_x) e^{c_v \cdot f(x,z)} + \hat{\lambda}_{N_x \cup \{z\}}^{(v)}(x, z),$$

In the above expressions, $\hat{\lambda}_{N_x \cup \{z\}}^{(v)}(x,z)$ represents the predicted edge strength between x and z, which may be obtained by regressing on features of the user pair (x, z). $\Lambda_{N_x}^{(v)}(x, N_x)$ may be observed directly. With $p_{xz}$ representing the probability that x connects to z after z is recommended to x as a new connection, interaction in the social network may be improved by recommending the user $\hat{z}$ that maximizes the predicted aggregated edge strength given a recommendation for x to connect to z:

$$\hat{z} = \arg\max_z p_{xz} \cdot \hat{\Lambda}_{N_x \cup \{z\}}^{(v)}(x, N_x \cup \{z\})$$

Finally, Equation 8 may be substituted into the expression above to obtain a solution.

Figure 4:
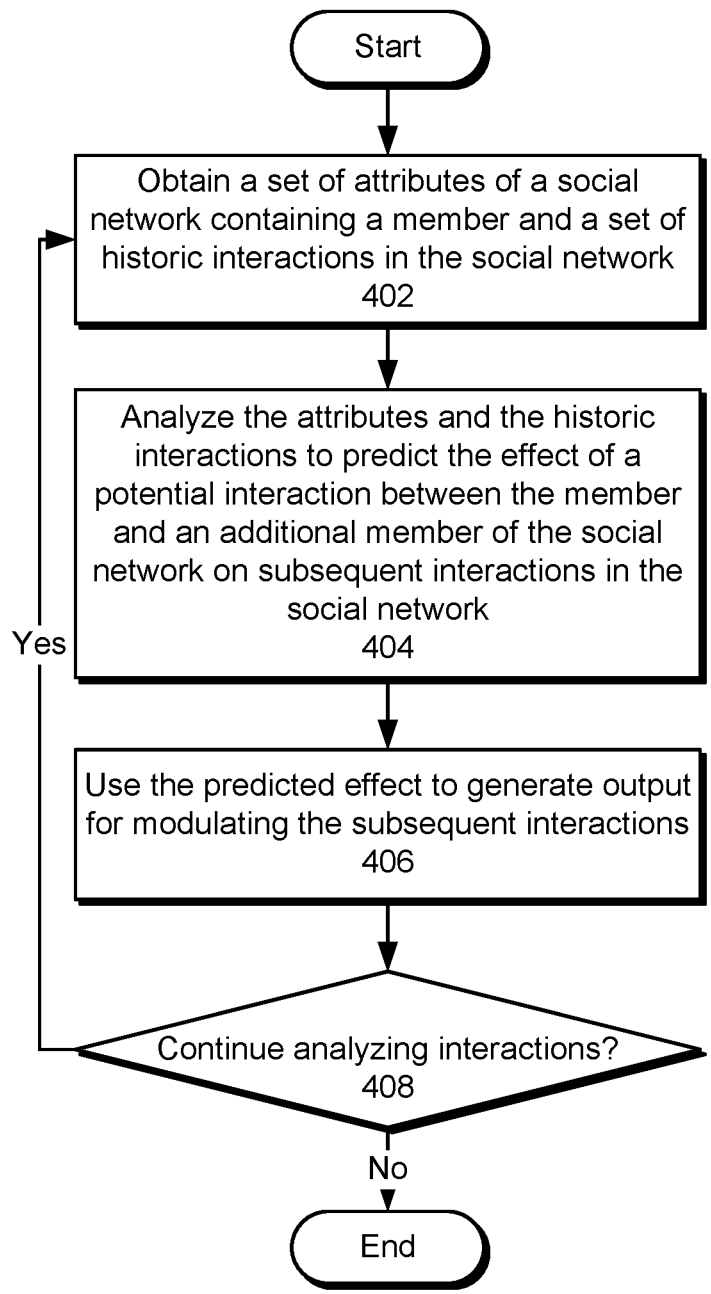
FIG. 4 shows a flowchart illustrating the process of facilitating interaction within a social network in accordance with the disclosed embodiments.

FIG. 4 shows a flowchart illustrating the process of facilitating interaction within a social network in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a set of attributes of a social network of a member and a set of historic interactions in the social network are obtained (operation 402). The attributes may include member segments in the social network, such as industries, companies, company types, schools, skills, decision makers, seniorities, and/or job functions of the members. The historic interactions may include profile views, feed interactions (e.g., viewing, clicking, commenting on, and/or liking posts or updates in a news feed), active interactions (e.g., messages, endorsements, etc.), and/or new connections between members in the social network.

Next, the attributes and the historic interactions are analyzed to predict the effect of a potential interaction between the member and an additional member of the social network on subsequent interactions in the social network (operation 404), as described in further detail below with respect to FIG. 5. For example, the attributes and historic interactions may be used to predict a change (e.g., increase or decrease) in the member's interaction with other members of the social network after the member connects to the additional member.

The predicted effect is then used to generate output for modulating the subsequent interactions (operation 406). For example, a new connection and/or other type of interaction that produces a predicted increase in the member's social network interactions may result in the outputting of a recommendation to form the new connection and/or conduct the type of interaction. In another example, non-recommendation-based output may include the display of certain posts, reminders, and/or profiles to encourage certain types of interaction between certain pairs of members.

Interactions in the social network may continue to be analyzed (operation 408) for other members and/or attributes of the social network. For example, operations 402-406 may be repeated for additional members, types of interaction, member segments, and/or sets of attributes in the social network.

Figure 5:
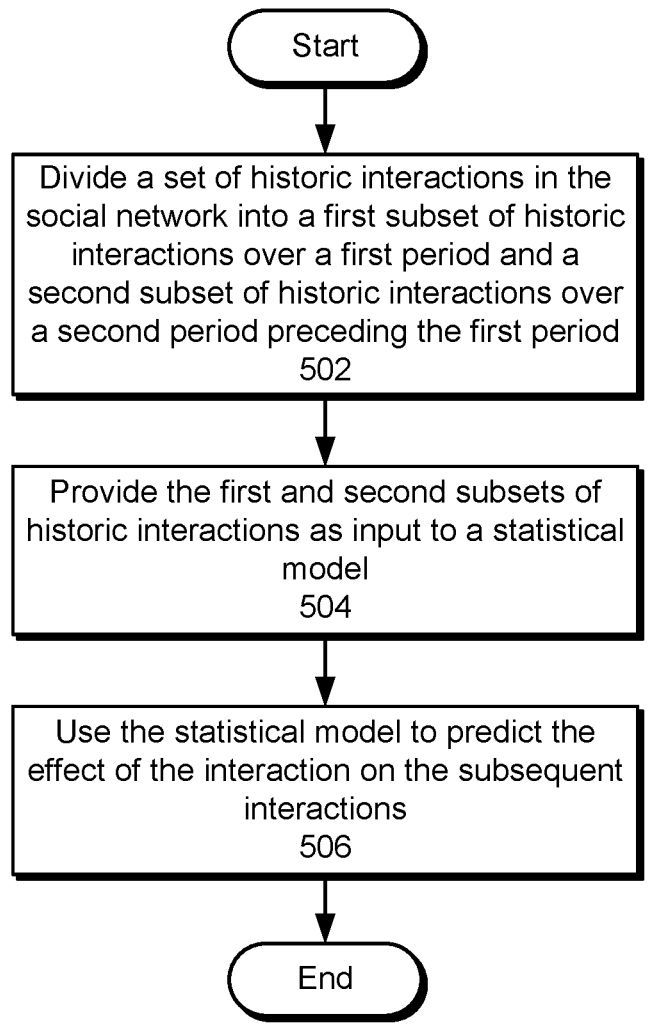
FIG. 5 shows a flowchart illustrating the process of predicting the effect of an interaction within a social network on subsequent interactions in the social network in accordance with the disclosed embodiments.

FIG. 5 shows a flowchart illustrating the process of predicting the effect of an interaction within a social network on subsequent interactions in the social network in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a set of historic interactions in the social network is divided into a first subset of historic interactions over a first period and a second subset of historic interactions over a second period preceding the first period (operation 502). For example, the historic interactions may include views of different types of interactions in the social network. The views may be divided into one set of interactions that occurred within a current period (e.g., a current week, month, number of months, etc.) and another set of interactions that occurred within a previous period of the same length that immediately precedes the current period.

Next, the first and second subsets of historic interactions are provided as input to a statistical model (operation 504), and the statistical model is used to predict the effect of the interaction on the subsequent interactions (operation 506). For example, parameters of the statistical model may be estimated by regressing on feature vectors containing the subsets of historic interactions, and a value of a variable representing the effect of the interaction may be produced by applying the statistical model to one or both subsets of historic interactions. Different versions of the statistical model may be trained to model and/or modulate different types of interactions (e.g., profile views, feed interactions, active interactions, new connections), or the same statistical model may be used to model and predict multiple or all types of interactions in the social network. The predicted effect may then be used to modulate subsequent interaction in the social network, as described above.

Figure 6:
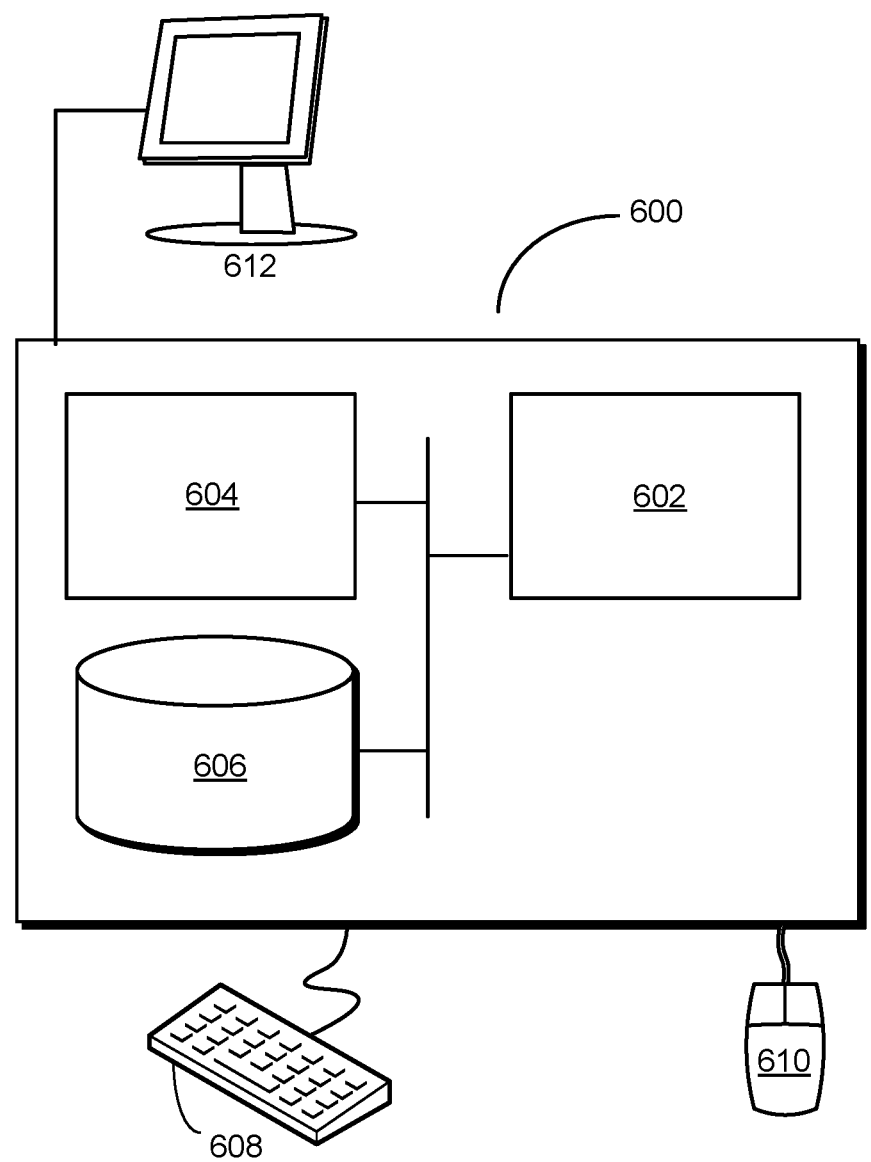
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating interaction within a social network. The system may include an analysis apparatus that obtains a set of attributes of a social network of a first member and a set of historic interactions in the social network. Next, the analysis apparatus may analyze the attributes and the historic interactions to predict an effect of an interaction between the first member and a second member of the social network on subsequent interactions in the social network. The system may also include a management apparatus that uses the predicted effect to generate output for modulating the subsequent interactions in the social network.

In addition, one or more components of computer system 600 may be remotely located and connected to the other components over a network. Portions of the present embodiments (e.g., analysis apparatus, management apparatus, statistical model, modeling apparatus, etc.) may also be located on different nodes of a distributed system that implements the embodiments. For example, the present embodiments may be implemented using a cloud computing system that characterizes and manages interactions among members that access a social network through a set of remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
obtaining a set of attributes of a social network comprising a first member and a set of historic interactions in the social network;
analyzing, by one or more computer systems, the attributes and the historic interactions to predict an effect of a potential interaction between the first member and a second member of the social network on subsequent interactions in the social network, wherein the predicted effect comprises a reduction in the subsequent interactions between the first member and members of the social network other than the second member; and
using the predicted effect to generate output for modulating the subsequent interactions in the social network, wherein the output comprises a recommendation to interact with a member of the social network other than the second member.

2. The method of claim 1, wherein analyzing the attributes and the historic interactions to predict the effect of the potential interaction on the subsequent interactions comprises:
applying a first statistical model to the attributes and the historic interactions to predict the effect of the potential interaction on a first type of the subsequent interactions.

3. The method of claim 2, wherein analyzing the attributes and the historic interactions to predict the effect of the potential interaction on the subsequent interactions further comprises:
applying a second statistical model to the attributes and the historic interactions to predict the effect of the potential interaction on a second type of the subsequent interactions.

4. The method of claim 1, wherein the output for modulating the subsequent interactions in the social network comprises:
a recommendation to form a new connection between the first and second members.

5. The method of claim 1, wherein the potential interaction between the first member and the second member comprises a connection between the first member and the second member.

6. The method of claim 1, wherein the predicted effect further comprises:
an increase in the subsequent interactions between the first member and other members of the social network.

7. The method of claim 1, wherein the set of historic interactions comprises:
a profile view;
a feed interaction;
an active interaction; and
a new connection.

8. The method of claim 1, wherein the set of attributes comprises at least one of:
a set of connections between pairs of members in the social network; and
a set of member segments associated with the members.

9. The method of claim 8, wherein the set of member segments is associated with at least one of:
an industry;
a company;
a company type;
a school;
a skill;
a decision maker;
a publisher;
a seniority; and
a job function.

10. An apparatus, comprising:
one or more processors; and
memory storing instructions that, when executed by the one or more processors, cause the apparatus to:
obtain a set of attributes of a social network comprising a first member and a set of historic interactions in the social network;
analyze the attributes and the historic interactions to predict an effect of a potential interaction between the first member and a second member of the social network on subsequent interactions in the social network, wherein the predicted effect comprises a reduction in the subsequent interactions between the first member and members of the social network other than the second member; and
use the predicted effect to generate output for modulating the subsequent interactions in the social, wherein the output comprises a recommendation to interact with a member of the social network other than the second member.

11. The apparatus of claim 10, wherein analyzing the attributes and the historic interactions to predict the effect of the potential interaction on the subsequent interactions comprises:
applying a first statistical model to the attributes and the historic interactions to predict the effect of the potential interaction on a first type of the subsequent interactions in the social network.

12. The apparatus of claim 11, wherein analyzing the attributes and the historic interactions to predict the effect of the potential interaction on the subsequent interactions further comprises:
applying a second statistical model to the attributes and the historic interactions to predict the effect of the potential interaction on a second type of the subsequent interactions.

13. The apparatus of claim 10, wherein the output for modulating the subsequent interactions between the first member and the other members comprises further comprises:
a recommendation to form a new connection between the first and second members.

14. The apparatus of claim 10, wherein the predicted effect further comprises:
a reduction in the subsequent interactions between the first member and other members of the social network.

15. The apparatus of claim 10, wherein the set of historic interactions comprises:
a profile view;
a feed interaction;
an active interaction; and
a new connection.

16. The apparatus of claim 10, wherein the set of attributes comprises at least one of:
a set of connections between pairs of members in the social network;
a set of member segments associated with the members; and
a level of engagement with the social network.

17. The apparatus of claim 16, wherein the set of member segments is associated with at least one of:
an industry;
a company;
a company type;
a school;
a skill;
a decision maker;
a publisher;
a seniority; and
a job function.

18. A system, comprising:
an analysis module comprising a non-transitory computer-readable medium comprising instructions that, when executed, cause the system to:
obtain a set of attributes of a social network comprising a first member and a set of historic interactions in the social network; and
analyze the attributes and the historic interactions to predict an effect of a potential interaction between the first member and a second member of the social network on subsequent interactions in the social network, wherein the predicted effect comprises a reduction in the subsequent interactions between the first member and members of the social network other than the second member; and
a management module comprising a non-transitory computer-readable medium comprising instructions that, when executed, cause the system use the predicted effect to generate output for modulating the subsequent interactions in the social network, wherein the output comprises a recommendation to interact with a member of the social network other than the second member.

19. The system of claim 18, wherein analyzing the attributes and the historic interactions to predict the effect of the potential interaction on the subsequent interactions comprises:

dividing the set of historic interactions into a first subset of historic interactions over a first period and a second subset of historic interactions over a second period preceding the first period;

providing attributes and the first and second subsets of historic interactions as input to a statistical model; and using the statistical model to predict the effect of the potential interaction on the subsequent interactions in the social network.

20. The method of claim 1, wherein analyzing the attributes and the historic interactions to predict the effect of the potential interaction on the subsequent interactions comprises:

determining a first aggregated edge strength between the first member and other members in the first member's connections after the potential interaction with the second member;

determining a second aggregated edge strength between the first member and the other members in the first member's connections before the potential interaction with the second member; and determining an evolutionary rate based on the first aggregated edge strength and the second aggregated edge strength, wherein the evolutionary rate is used to predict the effect of the potential interaction on the subsequent interactions.

* * * * *